(12) United States Patent
Hu

(10) Patent No.: US 9,014,984 B2
(45) Date of Patent: Apr. 21, 2015

(54) RESOLUTION MATCHED NONLINEAR RESOLUTION ENHANCEMENT OF WELL LOGS

(75) Inventor: Guoyu Hu, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 489 days.

(21) Appl. No.: 13/274,069

(22) Filed: Oct. 14, 2011

(65) Prior Publication Data

US 2013/0096834 A1    Apr. 18, 2013

(51) Int. Cl.
*G01V 3/38* (2006.01)
*G01V 1/48* (2006.01)

(52) U.S. Cl.
CPC ... *G01V 1/48* (2013.01); *G01V 3/38* (2013.01)

(58) Field of Classification Search
USPC ............... 702/2, 6, 11, 14, 17, 85, 90, 103; 324/303; 367/38
See application file for complete search history.

(56) References Cited

U.S. PATENT DOCUMENTS

| | | | |
|---|---|---|---|
| 5,329,235 A | 7/1994 | Zhou et al. | |
| 5,867,806 A | 2/1999 | Strickland et al. | |
| 6,337,568 B1 * | 1/2002 | Tutunji et al. | 324/303 |
| 6,810,331 B2 | 10/2004 | Bittar et al. | |
| 6,885,943 B2 | 4/2005 | Bittar et al. | |
| 7,184,367 B2 * | 2/2007 | Yin | 367/38 |

FOREIGN PATENT DOCUMENTS

WO    2004027682    4/2004

OTHER PUBLICATIONS

Great Britain Search Report for GB Patent Application No. GB1218362.0 dated Feb. 7, 2013, 5 pages.
Chew, et al. "Diffraction of axisymmetric waves in a borehole by bed boundary discontinuities," Geophysics. vol. 49, No. 10 (Oct. 1984): p. 1566-1595, 6 FIGS.

* cited by examiner

*Primary Examiner* — Mohamed Charioui
(74) *Attorney, Agent, or Firm* — Wong, Cabello, Lutsch, Rutherford & Brucculeri LLP (57) ABSTRACT

A technique for processing well logs performs a nonlinear resolution enhancement of raw well logs. The nonlinear enhancement procedure uses a modified Van Cittert nonlinear enhancement technique that avoids instabilities that can arise using Van Cittert techniques. The nonlinear enhancement can provide resolution matched results at a predetermined resolution.

20 Claims, 7 Drawing Sheets

RESOLUTION MATCHED NONLINEAR RESOLUTION ENHANCEMENT OF WELL LOGS

TECHNICAL FIELD

The present invention relates to the field of well logging, and in particular to a nonlinear resolution-matched technique for enhancing the resolution of well logs.

BACKGROUND ART

Well logs are obtained by lowering logging tools down the well and recording a series of data at different depths. Logging tools can be categorized in terms of their operating tool physics. They include resistivity tools, nuclear tools, acoustics tools, Nuclear Magnetic Resonance (NMR) tools, etc. Also, logging tools can be grouped based on the scenario in which the tool operates, e.g., Wireline Logging (WL) tools and Logging While Drilling (LWD) tools. WL tools are lowered into a well by attaching them to a wireline. Wireline Logging is the traditional way for collecting well logs. LWD is a more recent development in which logging tools are mounted on drill collars and logging is performed while drilling is going on. After well logs are collected, data processing techniques are often applied to facilitate data interpretation and well log analysis. Various data processing techniques exist for resistivity, acoustic, nuclear and NMR logs. Resolution enhancement of well logs has always been of interest to the oil and gas industry because such techniques improve accuracy in thinly bedded reservoir evaluation.

Resolution enhancement has been approached in different ways by professionals in the oil and gas industry. One is based on linear deconvolution and other is a nonlinear approach. Linear deconvolution utilizes deconvolution filters to deconvolve tool response to a target response function with a well-defined shape and resolution. For resistivity log processing, the popular choice for such target functions are Gaussian functions with 1 ft., 2 ft., or 4 ft. resolutions. A modern logging tool commonly has multiple depths of investigations as in the case of WL array induction and LWD propagation tools. The measurement at different depths of investigation usually produces different vertical resolutions. Linear deconvolution not only enhances vertical resolutions but also matches resolutions of all measurements at different depths of investigations at a preselected resolution. For example, if a 1 ft. target function is used in linear deconvolution, then measurement from all depths of investigations will be processed to have the same resolution at 1 ft. Such a linear deconvolution technique is described in U.S. Pat. No. 5,429,335 for processing LWD propagation logs. However, linear deconvolution is limited by the operating tool physics. When the tool response is very nonlinear, linear deconvolution will produce unacceptable artifacts. For induction tools, linearity worsens when the resistivity contrast in formation beds increases. High-contrast formations are not uncommon in well logging. For example, a shale formation can have resistivity at around 1 Ohm-m, while an anhydrite formation nearby can have resistivity at thousands of Ohm-m. Linearity also worsens when the operating frequency is higher. Thus, linear deconvolution has been recognized as insufficient in many scenarios.

To ameliorate the artifacts caused by the nonlinearity of the tool response, nonlinear resolution enhancement techniques have been developed. Nonlinear techniques are typically more robust than linear techniques, especially for logs acquired in high-contrast formations. One such method is described in U.S. Pat. No. 5,967,906, which recites a nonlinear enhancement similar to a Van Cittert iterative deconvolution technique that utilizes nonlinear modeling of the tool response rather than the response functions as in linear deconvolution techniques. The enhancement is performed on a square log and the enhanced square log is subsequently smoothed to produce the reduced resolution. A disadvantage of this enhancement technique is the amount of correction required on the original log can be very large for each iteration, which may lead to instabilities in a Van Cittert nonlinear enhancement process. Therefore, subsequent smoothing is always necessary for this technique as the last step in processing. In addition, although the technique mentions how to provide matched resolutions among different tool spacings, it fails to describe how to match resolutions at a preselected value, e.g. a fixed 2 ft. resolution.

SUMMARY OF INVENTION

Embodiments described herein provide a way to perform nonlinear resolution enhancement of well logs. The nonlinear enhancement uses a modified Van Cittert nonlinear enhancement that avoids the instabilities described above and can provide resolution matched results at a predetermined resolution.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the techniques described below are set forth in terms of an induction tool that performs resistivity measurements, the present invention is not so limited, and the disclosed techniques may be used with other types of logging tools, including acoustic and nuclear well logging tools. In addition, although described in terms of a well logging application herein, the techniques disclosed below may be used in applications other than well logging, including various image processing and signal processing applications.

Figure 1:
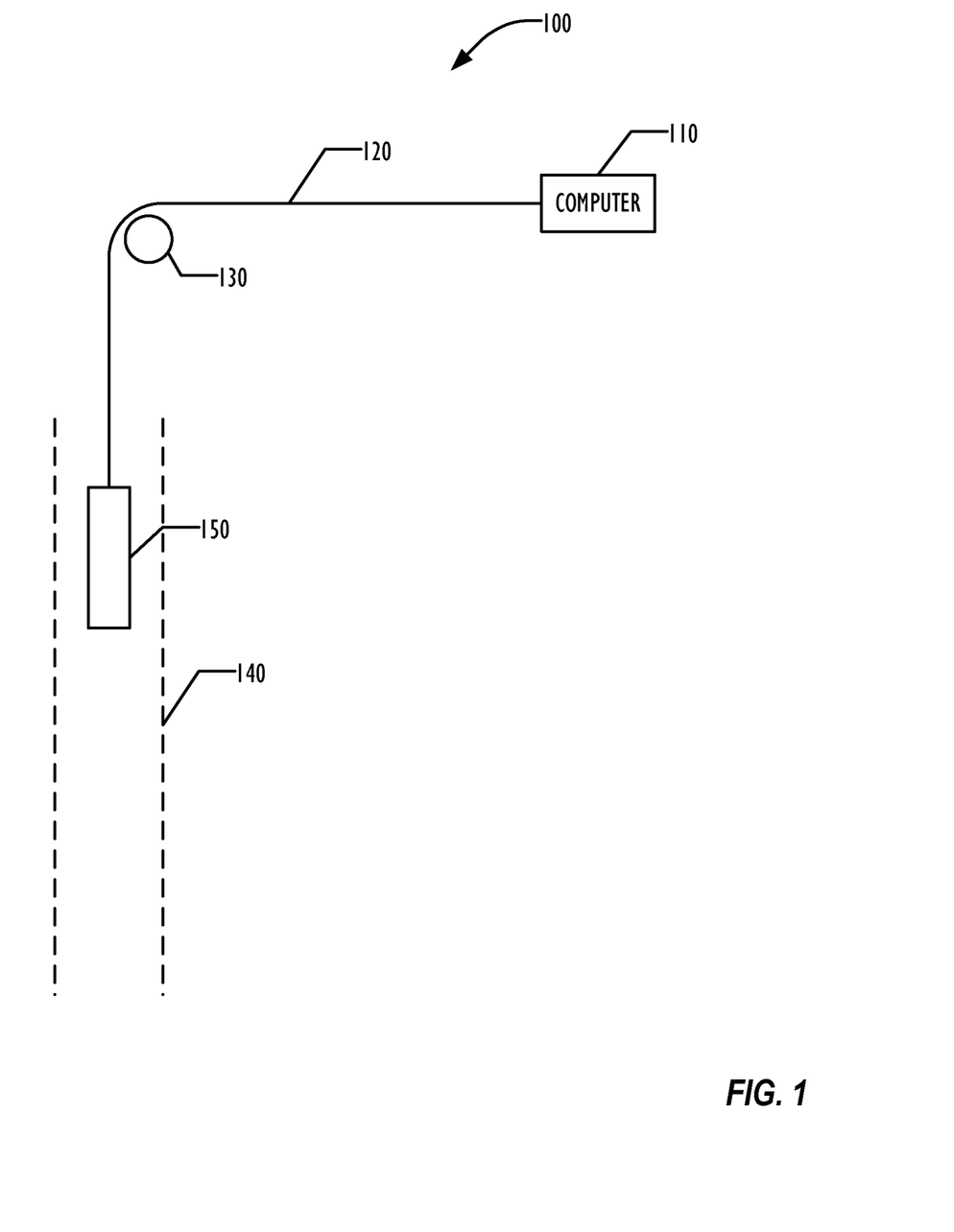
FIG. 1 is a block diagram illustrating elements of a wireline logging system according to one embodiment.

FIG. 1 is a block diagram illustrating a simplified WL system 100 according to one embodiment. A WL sensor array 150 is lowered into a borehole 140 on wireline 120, typically using a lowering/raising mechanism 130 for positioning the array 150 in the borehole 140. The wireline is typically connected electrically to a computer 110 where the signals generated by the array 150 may be received and captured for analysis purposes. Other conventional elements known to the well logging industry may be present in addition to those illustrated in FIG. 1, but are omitted for clarity.

In some embodiments, the computer 110 may also analyze the wireline data captured from the array 150; in other embodiments, the wireline data captured by the computer 110 is sent to another computer system (not shown) for analysis. Although the computer 110 is illustrated in FIG. 1 as local to the well, the computer 110 may be located remotely, and the well logging data transmitted from the well site to the computer 110 using any desired transmission technique, wireless or wired. In one embodiment, the computer 110 is local to the well site and may capture and store the logging data, then transmit the logging data to a remote computer for analysis, using any type of data transmission techniques, including shipment of physical media on which the logging data has been received and stored. In other embodiments, the computer 110 may perform some analysis on the received logging data and transmit the raw and/or analyzed received logging data to the remote computer for further analysis.

In an LWD embodiment (not shown), a sensor array is lowered into the borehole as part of a drilling string, instead of as an element positioned on a wireline 120. As with the WL embodiment illustrated in FIG. 1, data from the sensor array is transmitted from the drill string as signals to a computer 110, wirelessly or by wire, for capture and possible analysis. The LWD sensor array is typically mounted in a drill collar above the bit suspended beneath the surface of the earth from a drilling rig by drill pipe. Unlike a WL embodiment, LWD logging by definition is performed while drilling the well. The various embodiments described herein may be used in either a WL or LWD configuration.

The traditional dual induction tool records these two apparent resistivity measurements at two different depths of investigation, typically designated as ILM (medium measurement) and ILD (deep measurement). These curves may be combined with other curves, such as a Spherically Focused Log (SFL) curve. Embodiments described below provide a technique for enhancing the ILM and ILD curves, with the goal of bringing them closer to the actual resistivity of the formation.

A frequency effect causes the induction response of the typical induction logging tool to change even for the same tool transmitter-receiver spacing. As is known in the art, lower frequencies typically investigate a deeper area than higher frequencies. The frequency effect is nonlinear, which results in a nonlinear induction logging tool response, which may make the use of nonlinear enhancement techniques such as the embodiments described below more useful and accurate than linear enhancement techniques, even though nonlinear techniques may require greater computing resources and take longer to produce results than linear techniques.

In one embodiment, described in more detail below, a vertical processing module (VPM) stage enhances and matches logs from an induction logging tool at one or more predetermined resolutions. This is accomplished with an improved Van Cittert method, as described in more detail below. In another embodiment, the VPM stage may be followed by a radial processing module (RPM) stage to produce fixed depth of investigation curves.

Figure 2:
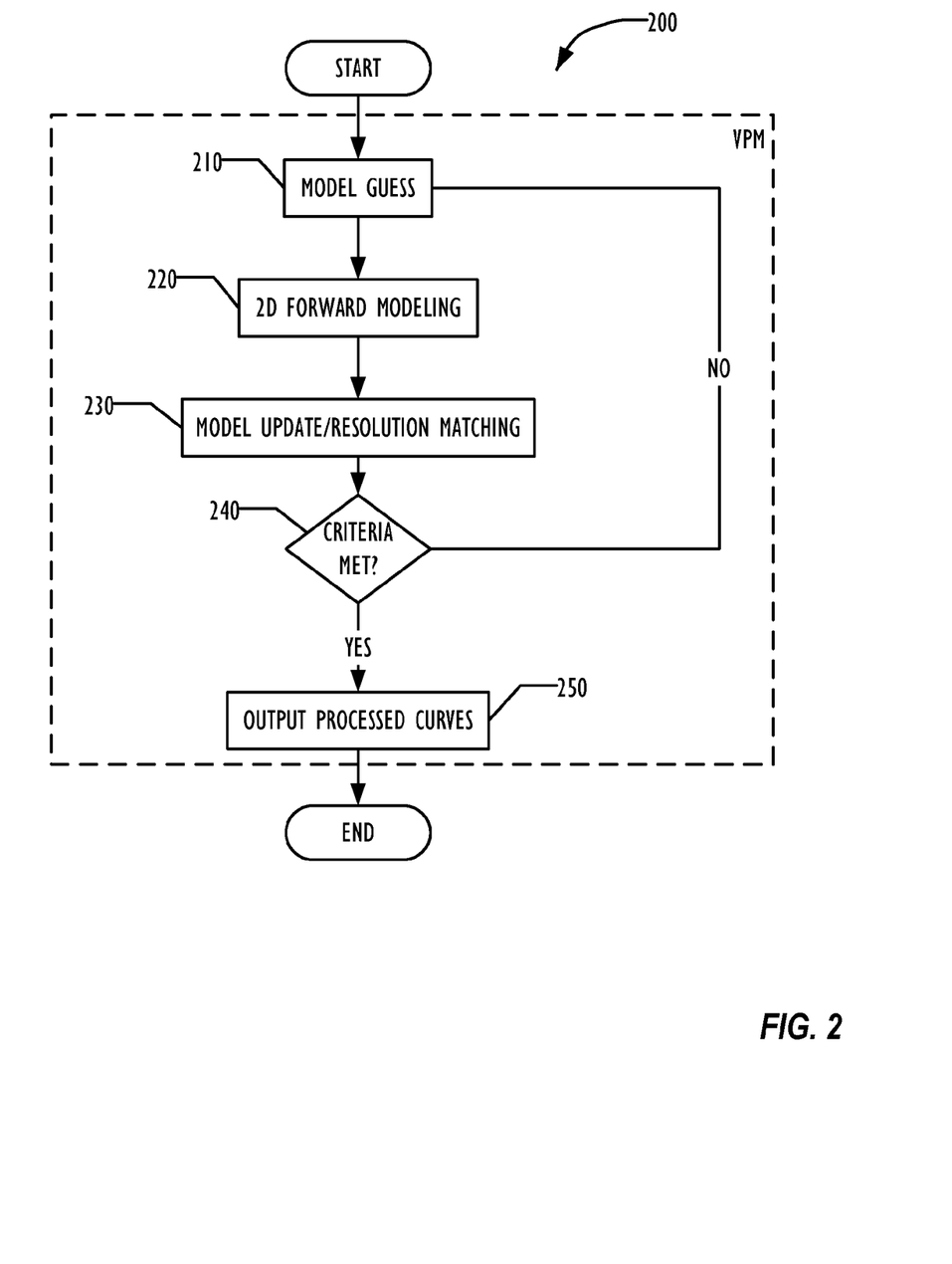
FIG. 2 is a flowchart illustrating processing of a well log according to one embodiment.

FIG. 2 is a flowchart illustrating processing steps for a VPM stage according to one embodiment. In block 210, an initial estimate is made of the formation profile. In later iterations, this initial estimate is the estimate generated by the previous iteration of the technique. In block 220, a 2D forward modeling technique is used to simulate the response of the logging tool.

In one embodiment, a nonlinear 2D modeling algorithm is used in block 220. For example, a numerical mode matching method may be used to provide 2D forward modeling, but any desired type of 2D modeling technique known to the art may be used. The 2D forward modeling technique preferably includes borehole and bed modeling, in order to account for borehole effects.

The current iteration of the enhancement processing is then performed in block 230, using the modified Van Cittert formula set forth below.

If one or more predetermined criteria have been met, as determined in block 240, then in block 250 the VPM stage completes by outputting the processed curves. Otherwise, the iterative non-linear procedure repeats beginning at block 210. In one embodiment, the predetermined criteria comprise an integer number of iterations, for example 5 or 6 iterations. Other embodiments may use one or more other predetermined criteria as desired, including how well the simulated data matches the field data.

Where a predetermined number of iterations is used as a criterion for completing the VPM stage, the predetermined number may be selected by an analyst experimentally, based on how well the model agrees with the raw logging data. There is a tradeoff between accuracy and speed, because more iterations may produce a higher accuracy, but at a cost of additional processing time and resources. Where a predetermined number of iterations is used, the predetermined number may vary based on various factors, such as the type of logging or the tool being used. For example, nuclear logging might result in a different fixed maximum number of iterations being used than induction logging.

Figure 3:
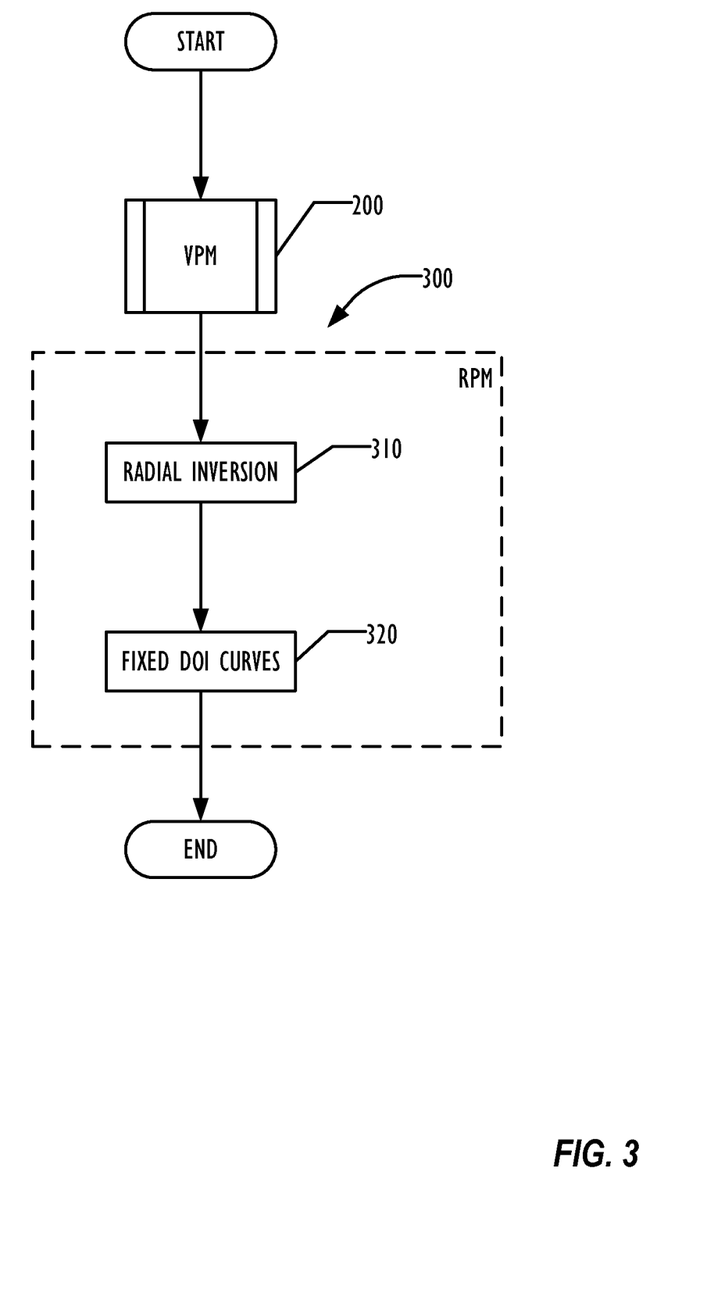
FIG. 3 is flowchart illustrating processing of a well log according to another embodiment.

FIG. 3 is a flowchart illustrating an embodiment that includes both a VPM stage 200 and an RPM stage 300. In block 310, a radial inversion technique may be used on the processed curves output by the VPM stage 200 to yield an inverted radial profile, using any known desired radial inversion technique. Then in block 320, fixed depth of investigation (DOI) curves may be computed by convolving the inverted radial profiles produced by block 310 with a set of preselected target functions. Other radial processing techniques may be used in addition to or instead of the radial inversion and convolution techniques illustrated in FIG. 3. For example, as formation resistivity increases above some threshold value, multi-frequency radial inversion may be inappropriate, since at zero conductivity the skin effect (of any order) disappears. Thus in one embodiment, if the resistivity of the formation is above a pre-determined multi-frequency inversion threshold (MFIT), for example 20 Ohm-m, then instead of the techniques illustrated in FIG. 3, an interpolation and/or extrapolation technique known to the art may be used to generate the fixed depth of investigation curves.

Performing resolution matched nonlinear resolution enhancement according to embodiments disclosed herein results in more robust resolution matched and enhanced well logs without the need of subsequent smoothing of a square log. In addition, embodiments of this technique may provide matched resolutions at preselected resolution values, e.g. 1 ft., 2 ft., and 4 ft. resolutions. Thus, embodiments of the nonlinear resolution enhancement technique may provide matched resolutions at preselected fixed values in a stable manner.

The original Van Cittert algorithm is $$T(f)=f+\tau(g-Af)$$

where

T(f) is the resolution-enhanced signal;
g is the raw signal;
f is the current guess of the true formation profile, initially estimated from the raw log;
A is a nonlinear modeling operator; and
$\tau$ is a relaxation factor. The simplest form treats every sample point as an independent bed.

Van Cittert calculations, as typical in nonlinear enhancement techniques, are iteratively performed. A problem with the unmodified Van Cittert technique is that the enhanced resolution is not controlled. In addition, the unmodified Van Cittert algorithm can be unstable. Typical end-desired deliverables in induction log processing are matched resolution curves, e.g. 2 ft. resolution curves achieved through linear deconvolution. The unmodified Van Cittert algorithm does not teach how to provide resolution matching at a pre-determined fixed value, e.g. 2 ft.

As described above, some conventional techniques try to overcome the instability of the Van Cittert method by applying smoothing as a last step. However, such a technique may result in erroneous results because the instabilities may become so large during the iterative technique that smoothing techniques performed after the iterative procedure may be insufficient to overcome the instabilities. Furthermore, conventional techniques do not provide for predetermined fixed resolution matching. Embodiments of the modified Van Cittert technique described below provide a more stable alternative, while supplying matched resolutions at fixed quantitative values, e.g. 2 ft. and 4 ft. resolutions.

In one embodiment, a modified formula for a given iteration is $$T_{new}(f)=T_{old}(f)+[\tau_1(g-Af)-\tau_1(f-F*f)]$$

where f is the current estimate of the true formation profile. In one embodiment, in the first iteration, f is determined by picking bed boundaries from g. In later iterations, f is determined by picking bed boundaries from $T_{new}(f)$ of the previous iteration. Thus, f is updated on every iteration of the procedure.

$T_{new}(f)$ is the updated enhanced estimate of the enhanced logging curve and $T_{old}(f)$ is the previous estimate of the enhanced logging curve. For the initial iteration, $T_{old}(f)$ is set to f; in later iterations, $T_{old}(f)$ is the value of $T_{new}(f)$ from the previous iteration. In the final iteration, $T_{new}(f)$ is output as the result of the computation.

F is a Gaussian filter with a pre-selected resolution, e.g. 2 ft.
g is the raw signal.

A is the nonlinear forward modeling operator. As with f, A changes with each iteration of the procedure, unlike a linear modeling approach, where A would remain unchanged. A nonlinear forward modeling operator, calculated every iteration of the procedure illustrated in FIG. 2 above, allows taking into account the nonlinear nature of the logging tool response.

$\tau_1$, and $\tau_2$ are relaxation factors.

The (g-Af) portion of the formula provides an enhancement factor that modifies the previous enhanced estimate of the enhanced well logging curve.

The (f-F*f) portion of the formula provides a resolution-matched stability factor that is subtracted from the enhancement factor to reduce or eliminate instabilities, as well as to cause the calculation to be resolution-matched.

The use of the Gaussian filter F causes the resulting enhanced signal to be resolution matched. Any desired resolution may be used to enhance the native resolution of the logging tool. The amount of resolution enhancement that is possible is typically limited by the tool physics and the tool sampling rate, according to the Nyquist sampling theorem. If there measurements produced by the tool have low resolution and high noise, then when the resolution enhancement is attempted, the noise may overwhelm the true signal if too much resolution enhancement is attempted. In one embodiment, the raw signal g is assumed to be a clean signal with little noise, and enhancement to a 2 ft. resolution typically does not create deleterious noise enhancement effects. Gaussian filters F with resolutions of 1 ft., 2 ft., and 4 ft. are known in the logging industry, and 2 ft. resolution is commonly considered the best resolution for most applications. One of ordinary skill in the art is typically able to view the raw signal g and determine what resolution will produce the best results. Any desired technique for creating the Gaussian filter F at the desired resolution may be used.

The nonlinear forward modeling operator A may be selected experimentally. Typically, a model of the logging tool is run in a model of the formation in which the actual tool is to be used for logging, using a preselected number of layers in the formation model, such that Af equals the simulated log response. If the logging tool has a linear response, then A may be a simple matrix. However, typical logging tools produce a nonlinear response, and A is a nonlinear operator. In one embodiment, the nonlinear operator may be produced by numerical mode matching techniques such as those described by W. Chew, et al. "Diffraction of Axisymmetric Waves in a Borehole by Boundary Discontinuities," *Geophysics, Vol.* 49, No. 5 (September-October 1984), pp. 1584-1596. Other techniques that may be used include finite element analysis techniques and finite difference techniques.

In one embodiment, the relaxation factors $\tau_1$, and $\tau_2$ may be simple numerical values, typically between 0.9 and 1.1. In alternate embodiments, the relaxation factors may be a nonlinear smooth function, such as a polynomial function. The use of relaxation factors is well known in Van Cittert-type calculations, and the specific relaxation factors may be selected experimentally for a specific logging tool.

In some embodiments, $\tau_1$ and $\tau_2$ may be combined into a single relaxation factor $\tau$, in which case the above formula simplifies to $$T_{new}(f)=T_{old}(f)+\tau[(g-Af)-(f-F*f)]$$

In the formulas set forth above, the stability factor (f-F*f) addresses the stability of the computation, by subtracting out instabilities produced by (g-Af). Each iteration therefore is constrained by subtracting out excessive enhancement, avoiding the need to post-perform smoothing or other operations to attempt to eliminate the instabilities in the Van Cittert formula. In addition, the stability factor causes the calculation of $T_{new}(f)$ to be resolution matched to the desired predetermined fixed resolution.

In an embodiment in which every sample point is treated as an independent bed, then the determination off of block 210 initially is f=g, and in later iterations, becomes $$f=T_{old}(f)$$

Thus, the formula for computing $T_{new}$ (f) becomes $$T_{new}(f)=T_{old}(f)+\tau[(g-AT_{old}(f))-(T_{old}(f)-F^*T_{old}(f))]$$

The disclosed techniques allow obtaining matched resolutions. Unlike conventional nonlinear enhancement techniques, various embodiments of the disclosed techniques try to get an updated log with a matched preselected resolution, e.g. a 2 ft. resolution at every update, instead of obtaining a square log, then smoothing the square log to get the final results. This is why the new techniques are more stable, because in the new method stabilization is enforced at every update, while the conventional techniques do not address stability until the final step, when it is often too late to do so.

Figure 4:
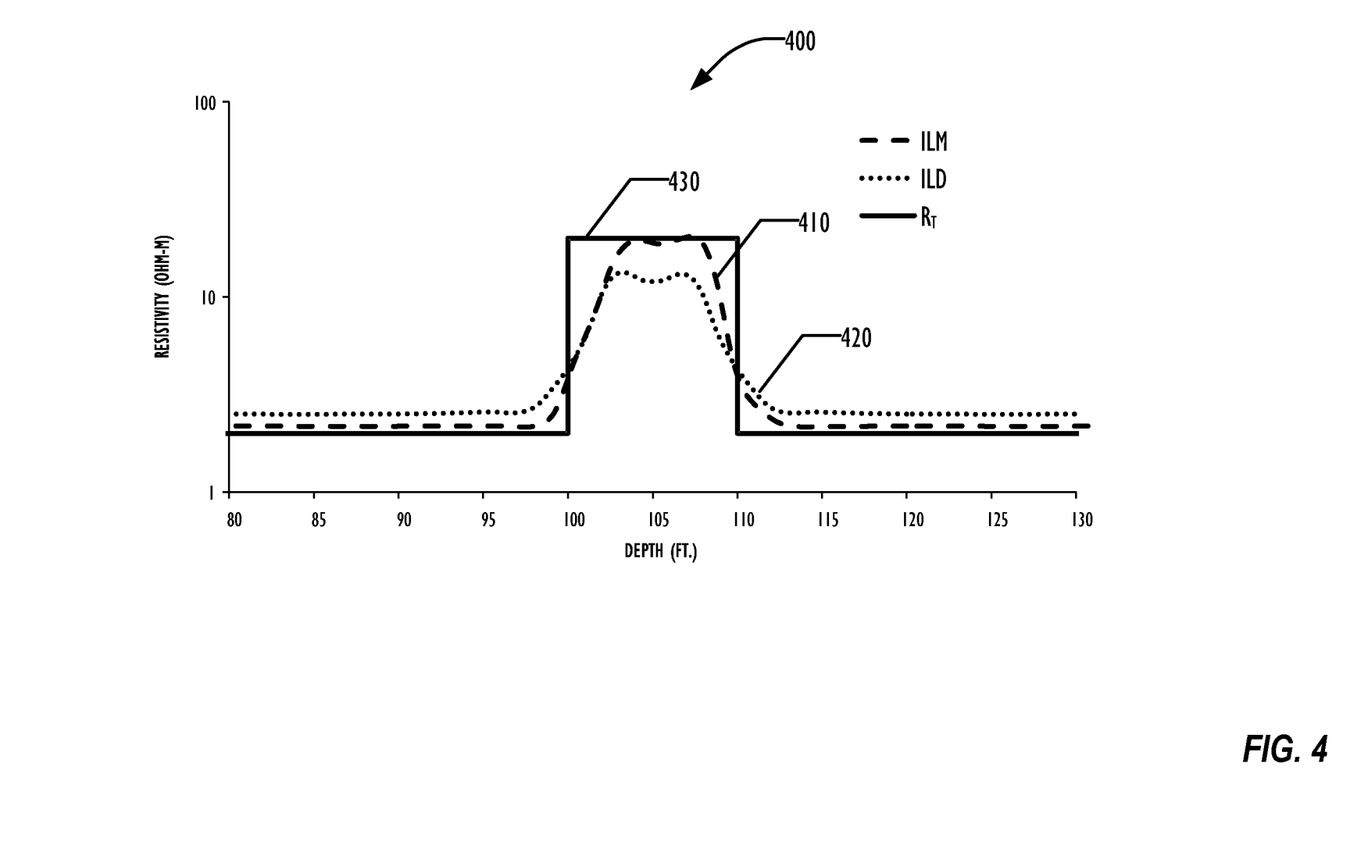
FIG. 4 is a graph illustrating an example of raw well log curves prior to enhancement.

FIG. 4 is a graph 400 illustrating a processing example using the techniques described above. In this example, the logging tool is an induction logging tool with two spacings, ILM and ILD at 20 KHz. In this example, the raw measurements were generated by computer simulation. The resistivity of a formation is typically designated as $R_t$. In a multi-frequency embodiment, ILM and ILD curves may be generated by the well logging tool at more than one frequency. In such an embodiment, the enhancement techniques described above may be performed on the curves of each frequency.

The $R_t$ curve 430 is the true profile of a simulated 10 foot wide bed, with an 8 inch borehole filled with 1 Ohm-m mud, thus borehole correction is automatically accounted for. Raw curve 410 is the medium spacing (ILM) curve, and raw curve 420 is the deep spacing (ILD) curve. As is visible in FIG. 4, ILM curve 410 and ILM curve 420 do not have matched resolutions, i.e., the two curves do not align with each other.

Figure 5:
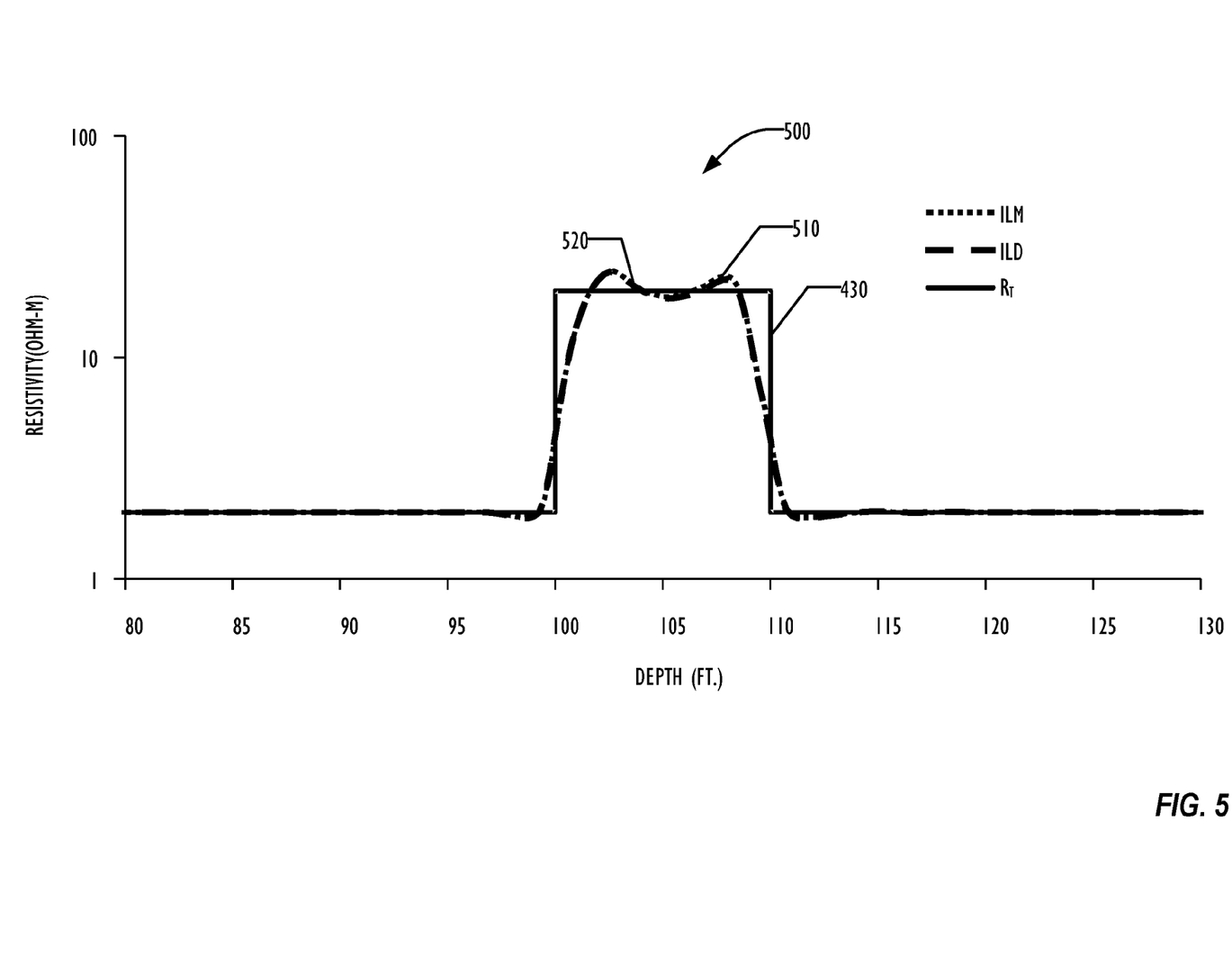
FIG. 5 is a graph illustrating enhanced well log curves matched to a 2 ft. resolution according to one embodiment.

FIG. 5 is a graph 500 illustrating enhanced ILM and ILD curves processed according to one embodiment of the technique illustrated in FIG. 2. As is visible in the graph 500, after the enhancement processing, the ILM and ILD curves 510 and 520 are matched to the true profile curve 430 at a predefined resolution, in this example 2 ft., a resolution frequently used because bed thickness is often better defined by 2 ft. curves than at other resolutions.

Figure 6:
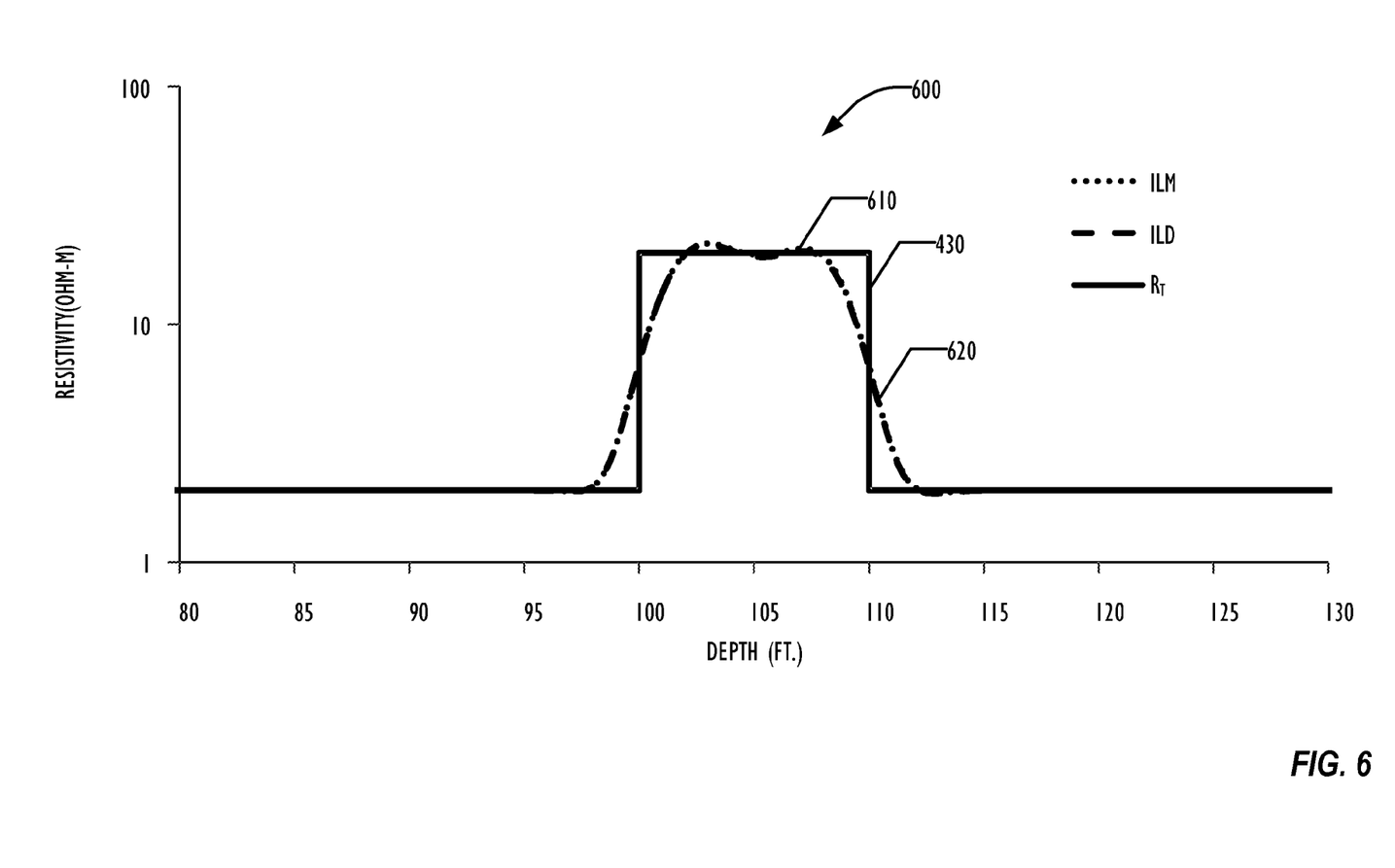
FIG. 6 is a graph illustrating enhanced well log curves matched to a 4 ft. resolution according to one embodiment.

FIG. 6 is a graph 600 illustrating enhanced ILM and ILD curves processed according to one embodiment of the technique illustrated in FIG. 2, using a 4 ft. resolution instead of the 2 ft. resolution of FIG. 5. As is visible in the graph 600, after the enhancement processing, the ILM and ILD curves 610 and 620 are matched to the true profile 430 at the 4 ft. resolution, but do not define the bed thickness as well as the 2 ft. curves, being more "smeared away" above and below the bed. However, 4 ft. resolution curves may be helpful when environmental noise in the measurement is prominent.

Figure 7:
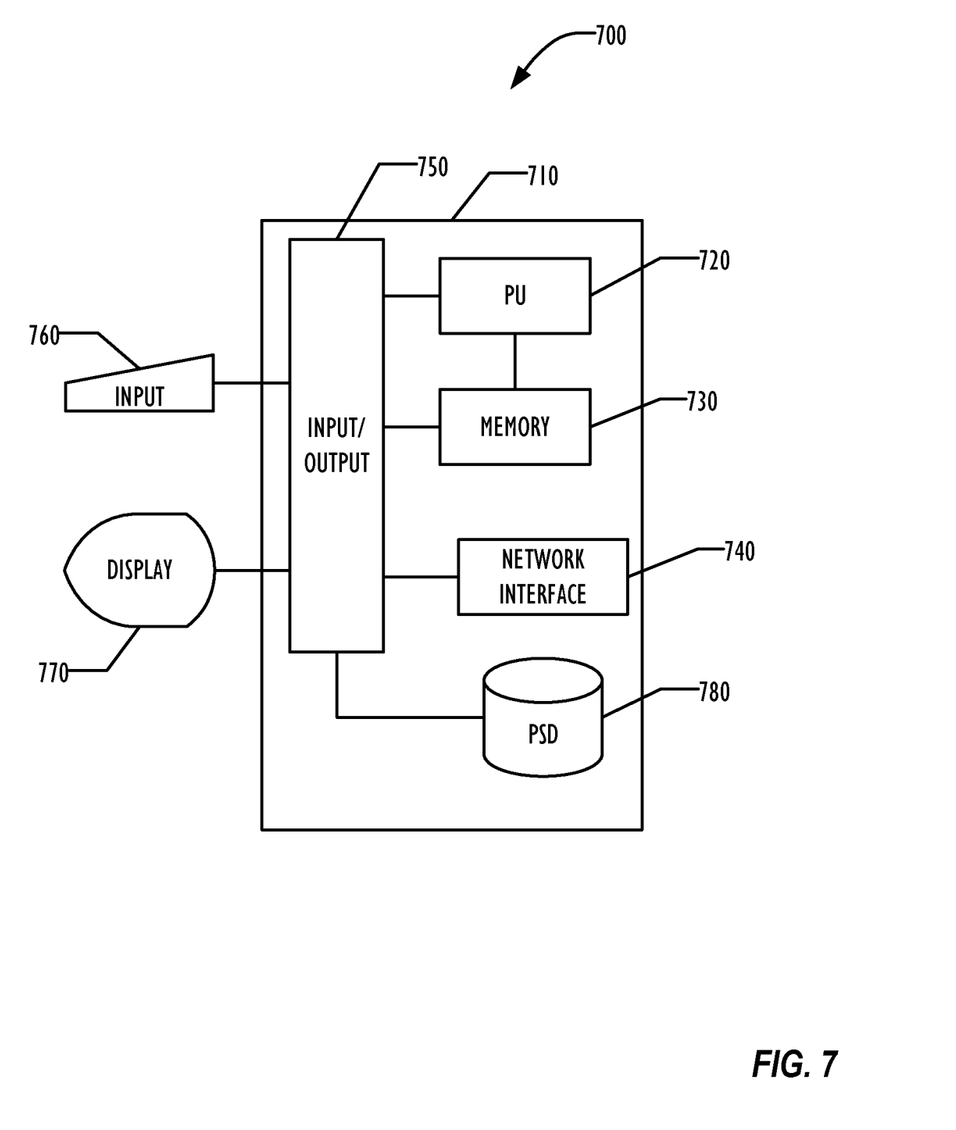
FIG. 7 is a block diagram illustrating a computer system for use in processing the well log signals according to one embodiment.

Referring now to FIG. 7, an example computer 700 for use in performing a nonlinear resolution-matched resolution enhancement technique is illustrated in block diagram form. Example computer 700 comprises a system unit 710 which may be optionally connected to an input device or system 760 (e.g., keyboard, mouse, touch screen, etc.) and display 770. A program storage device 780 (sometimes referred to as a hard disc) is included with the system unit 710. Also included with system unit 710 is a network interface 740 for communication via a network with other computing and corporate infrastructure devices (not shown). Network interface 740 may be included within system unit 710 or be external to system unit 710. In either case, system unit 710 is be communicatively coupled to network interface 740. Network interface 740 may be communicatively coupled to the well logging sensor array 150 for receiving raw well logging data from the well logging sensor array 150. Other techniques for communicatively coupling the computer 700 to the well logging sensor array 150 that may employ other interfaces or features of the computer 700 to allow the computer 700 to receive the raw well logging data may be used, including the transport of physical media containing the raw well logging data from a device coupled to the well logging sensor array 150 to the computer 700. Program storage device 780 represents any form of non-volatile storage including, but not limited to, all forms of optical and magnetic, including solid-state, storage elements, including removable media, and may be included within system unit 710 or be external to system unit 710. Program storage device 780 may be used for storage of software to control system unit 710, data for use by the computer 700, or both.

System unit 710 may be programmed to perform methods in accordance with this disclosure (an example of which is in FIG. 2). System unit 710 comprises a processor unit (PU) 720, input-output (I/O) interface 750 and memory 730. Processing unit 720 may include any programmable controller device. Memory 730 may include one or more memory modules and comprise random access memory (RAM), read only memory (ROM), programmable read only memory (PROM), programmable read-write memory, and solid-state memory. One of ordinary skill in the art will also recognize that PU 720 may also include some internal memory including, for example, cache memory.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of enhancing well logs produced by a well logging tool, comprising:
   receiving raw logging data from the well logging tool;
   calculating by a well logging analysis computer a nonlinearly enhanced logging data from the raw logging data, comprising:
   (a) selecting a resolution;
   (b) calculating an estimate of a formation profile;
   (c) calculating a nonlinear forward modeling operator corresponding to the well logging tool;
   (d) calculating an enhancement factor from the raw logging data, the estimate of the formation profile, and the nonlinear forward modeling operator;
   (e) calculating a resolution matched stability factor;
   (f) updating a previous nonlinearly enhanced logging data with the enhancement factor and the resolution matched stability factor to produce the nonlinearly enhanced logging data; and
   (g) repeating actions (a), (b), (c), (d), (e), and (f) for a predetermined number of iterations; and
   outputting the nonlinearly enhanced logging data.

2. The method of claim 1, wherein the act of calculating an estimate of a formation profile comprises:

calculating an estimate of the formation profile from the raw logging data in a first iteration; and calculating an estimate of the formation profile from the nonlinearly enhanced logging data in a second and following iterations.

3. The method of claim 1, wherein the act of updating a previous nonlinearly enhanced logging data with the enhancement factor and the stability factor to produce the nonlinearly enhanced logging data comprises:

modifying the enhancement factor by a first relaxation factor; and modifying the stability factor by a second relaxation factor.

4. The method of claim 3, wherein the first relaxation factor is equal to the second relaxation factor.

5. The method of claim 1, wherein the nonlinear forward modeling operator is based on a nonlinear response of the well logging tool.

6. The method of claim 1, wherein the act of calculating an enhancement factor comprises:

calculating a modified formation profile from the nonlinear forward modeling operator and the estimate of the formation profile; and subtracting the modified formation profile from the raw logging data.

7. The method of claim 1, wherein the act of calculating a stability factor comprises:

calculating a modified formation profile from a filter corresponding to the resolution and the estimate of the formation profile; and subtracting the modified formation profile from the estimate of the formation profile.

8. The method of claim 7, wherein the filter corresponding to the resolution is a Gaussian filter corresponding to the resolution.

9. The method of claim 1, wherein the act of calculating an estimate of the formation profile comprises:

considering every sample point of the well logging data as an independent bed of the formation; and estimating the formation profile as the previous nonlinearly enhanced logging data.

10. A non-transitory computer readable medium, on which is stored computer code that when executed causes a computer to perform actions comprising:

calculating a nonlinearly enhanced logging data from a raw logging data generated by a well logging tool, comprising:
(a) selecting a resolution;
(b) calculating an estimate of a formation profile;
(c) calculating a nonlinear forward modeling operator corresponding to the well logging tool;
(d) calculating an enhancement factor from the raw logging data, the estimate of the formation profile, and the nonlinear forward modeling operator;
(e) calculating a resolution matched stability factor;
(f) updating a previous nonlinearly enhanced logging data with the enhancement factor and the resolution matched stability factor to produce the nonlinearly enhanced logging data; and
(g) repeating actions (a), (b), (c), (d), (e), and (f) for a predetermined number of iterations; and outputting the nonlinearly enhanced logging data.

11. The non-transitory computer readable medium of claim 10, wherein the computer code when executed causes the computer to perform actions further comprising:

performing a radial processing of the nonlinearly enhanced logging data.

12. The non-transitory computer readable medium of claim 11, wherein the act of performing a radial processing of the nonlinearly enhanced logging data comprises:

receiving the nonlinearly enhanced logging data;

calculating an inverted radial profile by radially inverting the nonlinearly enhanced logging data; and convolving the inverted radial profile with a predetermined target function to produce a depth of investigation curve.

13. The non-transitory computer readable medium of claim 11, wherein the act of calculating an estimate of a formation profile comprises:

calculating an estimate of the formation profile from the raw logging data in a first iteration; and calculating an estimate of the formation profile from the nonlinearly enhanced logging data in a second and following iterations.

14. The non-transitory computer readable medium of claim 11, wherein the act of updating a previous nonlinearly enhanced logging data with the enhancement factor and the stability factor to produce the nonlinearly enhanced logging data comprises:

modifying the enhancement factor by a first relaxation factor; and modifying the stability factor by a second relaxation factor.

15. The non-transitory computer readable medium of claim 11, wherein the act of calculating an enhancement factor comprises:

calculating a modified formation profile from the nonlinear forward modeling operator and the estimate of the formation profile; and subtracting the modified formation profile from the raw logging data.

16. The non-transitory computer readable medium of claim 11, wherein the act of calculating a stability factor comprises:

calculating a modified formation profile from a filter corresponding to the resolution and the estimate of the formation profile; and subtracting the modified formation profile from the estimate of the formation profile.

17. A well logging and analysis system, comprising:
a well logging tool, configured to generate raw well logging data;
a well log analysis system, comprising:
a processor;
an interface, coupled to the processor and communicatively coupled to the well logging tool to receive the raw well logging data from the well logging tool; and
a storage subsystem, coupled to the processor, on which is stored progam code that when executed causes the processor to perform actions, comprising:
calculating a nonlinearly enhanced logging data from the raw logging data, comprising:
(a) selecting a resolution;
(b) calculating an estimate of a formation profile;
(c) calculating a nonlinear forward modeling operator corresponding to the well logging tool;
(d) calculating an enhancement factor from the raw logging data, the estimate of the formation profile, and the nonlinear forward modeling operator;
(e) calculating a resolution matched stability factor;
(f) updating a previous nonlinearly enhanced logging data with the enhancement factor and the resolution matched stability factor to produce the nonlinearly enhanced logging data; and
(g) repeating actions (a), (b), (c), (d), (e), and (f) for a predetermined number of iterations; and
outputting the nonlinearly enhanced logging data.

18. The well logging and analysis system of claim 17, wherein the act of calculating an estimate of a formation profile comprises:
- calculating an estimate of the formation profile from the raw logging data in a first iteration; and
- calculating an estimate of the formation profile from the nonlinearly enhanced logging data in a second and following iterations.

19. The well logging and analysis system of claim 17, wherein the act of calculating an enhancement factor comprises:
- calculating a modified formation profile from the nonlinear forward modeling operator and the estimate of the formation profile; and
- subtracting the modified formation profile from the raw logging data.

20. The well logging and analysis system of claim 17, wherein the act of calculating a stability factor comprises:
- calculating a modified formation profile from a filter corresponding to the resolution and the estimate of the formation profile; and
- subtracting the modified formation profile from the estimate of the formation profile.

* * * * *